(12) United States Patent
Meyer et al.

(10) Patent No.: US 7,799,889 B2
(45) Date of Patent: *Sep. 21, 2010

(54) POLYCARBONATES WITH GOOD WETTABILITY

(75) Inventors: Alexander Meyer, Düsseldorf (DE); Helmut Einberger, Odenthal (DE); Wolfgang Ebert, Krefeld (DE); Michael Prein, Krefeld (DE); Wilfried Haese, Odenthal (DE); Uli Franz, Erkrath (DE); Stephan Konrad, Dormagen (DE)

(73) Assignee: Bayer Materialscience AG, Leverkusen (DE)

( * ) Notice: Subject to any disclaimer, the term of this patent is extended or adjusted under 35 U.S.C. 154(b) by 564 days.

This patent is subject to a terminal disclaimer.

(21) Appl. No.: 11/312,020

(22) Filed: Dec. 20, 2005

(65) Prior Publication Data

US 2006/0135735 A1  Jun. 22, 2006

(30) Foreign Application Priority Data

Dec. 22, 2004  (DE) ........................ 10 2004 061 713

(51) Int. Cl.
  *C08G 64/00* (2006.01)
  *C08G 63/02* (2006.01)
(52) U.S. Cl. .................... 528/196; 264/176.1; 264/219; 369/47; 369/59.11; 369/59.24; 428/411.1; 428/412; 502/150; 528/198
(58) Field of Classification Search .............. 264/176.1, 264/219; 359/109, 642; 428/411, 412, 411.1; 528/196, 198; 369/47, 59.11, 59.24; 502/150
See application file for complete search history.

(56) References Cited

U.S. PATENT DOCUMENTS

| 4,737,573 | A |   | 4/1988 | Silva et al. ................... 528/371 |
| 5,376,741 | A | * | 12/1994 | Herrig et al. ................... 526/64 |
| 5,668,202 | A |   | 9/1997 | Hirata et al. ................. 524/154 |
| 5,973,102 | A |   | 10/1999 | McCloskey et al. ......... 528/196 |
| 5,973,103 | A | * | 10/1999 | Silva et al. ................... 528/196 |
| 6,001,953 | A | * | 12/1999 | Davis et al. ................. 528/196 |
| 6,140,457 | A |   | 10/2000 | LeGrand et al. ............. 528/196 |
| 6,548,691 | B2 |  | 4/2003 | Alewelt et al. ............... 558/274 |
| 2002/0077446 | A1 | * | 6/2002 | Alewelt et al. ............... 528/199 |
| 2002/0151672 | A1 | * | 10/2002 | Kauth et al. ................. 528/196 |
| 2004/0162439 | A1 | * | 8/2004 | Andou et al. ................ 558/268 |
| 2006/0155098 | A1 | * | 7/2006 | Kauth et al. ................. 528/196 |

FOREIGN PATENT DOCUMENTS

| JP | 62-296357 |   | 9/1987 |
| JP | 05214236 | * | 8/1993 |

OTHER PUBLICATIONS

Database CA [Online] Chemical Abstracts Service, Columbus, Ohio, US; Okamoto, Masaya: "Polycarbonate compositions with excellent transparency" XP002376196 gefunden im STN Database accession No. 120:78659 Zusammenfassung & JP 05 214236 A2 (Idemitsu Petrochemical Co, Japan) Aug. 24, 1993.

* cited by examiner

*Primary Examiner*—Terressa M Boykin
(74) *Attorney, Agent, or Firm*—John E. Mrozinski, Jr.; Noland J. Cheung

(57) ABSTRACT

The present invention provides a polycarbonate resin produced by the continuous interfacial process characterized in that after alkaline hydrolysis with sodium hydroxide, the polycarbonate resin contains an amount of 0.01 to 150 ppm of carbamate compounds according to formula (1)

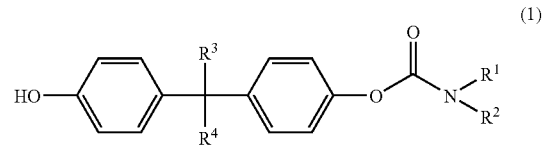

(1)

said amount measured by high pressure liquid chromatography, wherein $R^1$ and $R^2$ independently of one another denote hydrogen or $C_1$-$C_{12}$-alkyl, or together denote $C_4$-$C_{12}$-alkylidene, and $R^3$ and $R^4$ independently of one another denote hydrogen. $C_1$-$C_{12}$-alkyl or phenyl, or together with the carbon atom to which they are bonded form cyclohexyl or trimethylcyclohexyl, the process comprising phosgene reacting with at least one bisphenol at 8 to 17% molar excess of phosgene relative to the bisphenol.

9 Claims, No Drawings

US 7,799,889 B2

POLYCARBONATES WITH GOOD WETTABILITY

FIELD OF THE INVENTION

The invention concerns polycarbonates and in particular polycarbonates suitable as a subtrate material for the production of injection-molded parts, in particular for the preparation of coatable injection-molded parts.

TECHNICAL BACKGROUND OF THE INVENTION

Molded parts in the context of the invention preferably include transparent molded parts, such as transparent sheets, lenses, optical storage media and carriers for optical storage media respectively, or also articles from the automotive glazings sector, such as for example headlight diffusers. The invention provides in particular optical storage media and carriers for optical storage media, such as for example writeable optical data storage media that exhibit a good coatability and wettability and that are suitable for example for the application of colorants from solution, in particular from non-polar media. In addition the optical injection-molded parts made from the polycarbonates according to the invention have a lesser tendency to become contaminated.

Transparent injection-molded parts are important in particular in the glazings and storage media sectors.

Optical data recording materials are increasingly used as variable recording and/or archiving medium for large amounts of data. Examples of this type of optical data storage media are CDs, superaudio-CDs, CD-Rs, CD-RWs, DVDs, DVD-Rs, DVD+Rs, DVD-RWs, DVD+RWs and BDs.

Transparent thermoplastic materials such as for example polycarbonate, polymethyl methacrylate and chemical modifications thereof are typically used for optical storage media. Polycarbonate as substrate material is suitable in particular for write-once optical discs and read-many optical discs as well as for write-many optical discs, and also for the production of molded parts in the automotive glazings sector, such as for example headlamp diffusers. This thermoplastic material has an excellent mechanical stability, is only slightly susceptible to dimensional changes, and is characterised by a high transparency and impact resistance.

Polycarbonate produced by the phase interface (interfacial) process may be used for the production of optical data storages of formats described above such as Compact Discs (CDs) or Digital Versatile Discs (DVDs). These discs often have the property that they build up a high electrostatic field during their production in the injection-molding process. This high electrostatic field on the substrate during the production of the optical data storage media attracts for example dust from the surroundings or causes the injection-molded articles to stick together, for example disks to stick to one another, which reduces the quality of the finished injection-molded articles and complicates the injection-molding process.

It is furthermore known that the electrostatic charge (in the form of electrostatic fields) in particular of discs (for optical data carriers) leads to an inadequate wettability in particular with non-polar media, such as for example a non-polar colorant or application of a colorant from solvents, such as for example dibutyl ether, ethylcyclohexane, tetrafluoropropanol, cyclohexane, methylcyclohexane or octafluoropropanol. Thus, a high electrostatic field on the surface of the substrate during the application of a colorant in the case of writeable data storages causes for example an irregular coating with the colorant and thus leads to defects in the information layer.

The degree of the electrostatic charging of a substrate material may be quantified for example by measuring the electrostatic field at a certain distance from the substrate surface.

In the case of an optical data storage in which a writeable layer is applied to the surface by a spin-coating process, a low electrostatic field is necessary in order to guarantee the uniform application of the writeable layer and ensure a problem-free production process.

In addition a high electrostatic field causes yield losses with regard to the substrate material on account of the above mentioned factors. This may lead to a stoppage of the respective production step and is associated with high costs. Many approaches have been followed in order to solve this problem of a high electrostatic charge. In general antistatics are added as additives to the substrate material. Antistatic polycarbonate compositions are described for example in JP 62 207 358-A. Here, inter alia, phosphoric acid derivatives are added as antistatics to the polycarbonate. EP 0922 728-A describes various antistatics such as polyalkylene glycol derivatives, ethoxylated sorbitan monolaurate, polysiloxane derivatives, phosphine oxides, as well as distearylhydroxyamine, which are used individually or as mixtures. Japanese application JP 62 207 358 describes esters of phosphorous acid as additives. Sulfonic acid derivatives are described in U.S. Pat. No. 5,668, 202. In WO 00/50 488 3,5-di-tert.-butylphenol is used as chain terminator in the phase interface process. This chain terminator leads to a low static charge of the corresponding substrate material compared to conventional chain terminators. JP 62 207 358-A describes polyethylene and polypropylene derivatives as additives for polycarbonate.

The additives described above may however have a disadvantageous effect on the properties of the substrate material, since they tend to leach out from the material. Although this is a desirable effect as regards the antistatic properties, it may lead to the formation of deposites in the mold and/or inaccurate molding. Furthermore, the content of oligomers in the polycarbonate may also lead to poorer mechanical properties and to a reduction of the glass transition temperature. In addition these additives may cause secondary reactions. The subsequent "endcapping" of polycarbonate that has been obtained by the transesterification process is complicated and the results achieved are not optimal. Moreover, high costs are involved in introducing new terminal groups into the material.

The object therefore exists of providing a composition and a substrate material that satisfies the requirements of as low a electrostatic field as possible on the substrate surface and that avoids the disadvantages described above.

This object has surprisingly been achieved by restricting the content of specially structured carbamate compounds in materials that are used for the production of optical data storages. A certain amount of carbamate compounds in the substrate material may arise due to the addition of additives, impurities in precursors, or due to the production process itself.

SUMMARY OF THE INVENTION

A polycarbonate that after alkaline hydrolysis with sodium hydroxide contain a small amount of carbamate compounds according to formula (I)

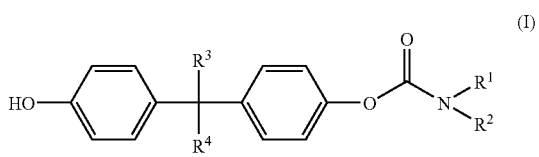

wherein
- R¹ and R² independently of one another denote hydrogen or $C_1$-$C_{12}$-alkyl, preferably methyl, ethyl, propyl, isopropyl or butyl, or together denote $C_4$-$C_{12}$-alkylidene, preferably $C_4$-$C_8$-alkylidene, particularly preferably $C_4$-$C_5$-alkylidene, and
- R³ and R⁴ independently of one another denote hydrogen, $C_1$-$C_{12}$-alkyl, preferably $C_1$-$C_8$-alkyl, or phenyl, or together with the carbon atom to which they are bonded form cyclohexyl or trimethylcyclohexyl.

The method of determination of the amount of a compound according to formula (I) is described in the experimental part. The amount of the compound of formula (1) is that which is determined by high pressure liquid chromatography (HPLC), after alkaline hydrolysis with sodium hydroxide. The inventive polycarbonate that exhibits low electrostatic field is suitable for making injection-molded articles.

DETAILED DESCRIPTION OF THE INVENTION

The present invention provides polycarbonates that after alkaline hydrolysis with sodium hydroxide contain an amount of 0.01 to 150 ppm, preferably 0.01 to 100 ppm and particularly preferably 0.01 to 50 ppm, of compounds of the formula (1)

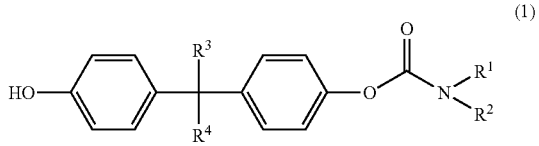

wherein
- R¹ and R² independently of one another denote hydrogen or $C_1$-$C_{12}$-alkyl, preferably methyl, ethyl, propyl, isopropyl or butyl, or together denote $C_4$-$C_{12}$-alkylidene, preferably $C_4$-$C_8$-alkylidene, particularly preferably $C_4$-$C_5$-alkylidene, and
- R³ and R⁴ independently of one another denote hydrogen, $C_1$-$C_{12}$-alkyl, preferably $C_1$-$C_8$-alkyl, or phenyl, or together with the carbon atom to which they are bonded form cyclohexyl or trimethylcyclohexyl, the amount being determined by high pressure liquid chromatography (HPLC), after alkaline hydrolysis with sodium hydroxide.

The injection molded article, preferably an optical data storage medium, obtainable by the polycarbonates according to the invention exhibit a low electrostatic field. This is important in particular for the production of optical storage media.

The content of compounds of the formula 1 may be influenced by several factors. For example, the purity of the educts and auxiliary substances is important. In addition process parameters such as the molar ratio of bisphenol and phosgene that are used, temperatures during the reaction, and the reaction and residence times are decisive. For the person skilled in the art the aim is therefore to control the process in such a way that the limits according to the invention of the carbamate content in the substrate material are not exceeded. The described measurement of the content of compound according to formula (1) is for the person skilled in the art a suitable way of controlling the process.

An appropriate choice of process parameters in order to obtain the substrate material may appear as follows:

The production of the substrate material may take place in a continuous phase interface process (interfacial process). Whereas the excess of phosgene that is used, referred to the sum of the bisphenols used, is between 3 and 100 mole %, preferably between 5 and 50 mole % in conventional continuous polycarbonate syntheses, the substrate material according to the invention is produced with phosgene excesses of 5 to 20 mole %, preferably 8 to 17 mole %. At the same time the pH value of the aqueous phase during and after the phosgene addition is maintained in the alkaline range, preferably between 8.5 and 12, by single or repeated subsequent addition of sodium hydroxide or appropriate subsequent addition of bisphenolate solution, while after the addition of catalyst the pH is adjusted to 10 to 14. The temperature during the phosgenation is 0° to 40° C., preferably 5° to 36° C.

The production of the polycarbonates according to the invention is carried out by the interfacial process. This process for polycarbonate synthesis is described copiously in the literature; reference may be made for example to H. Schnell, Chemistry and Physics of Polycarbonates, Polymer Reviews, Vol. 9, Interscience Publishers, New York, 1964, p. 33 ff., to Polymer Reviews, Vol. 10, "Condensation Polymers by Interfacial and Solution Methods", Paul W. Morgan, Interscience Publishers, New York, 1965, Chapter VIII, p. 325, to Drs. U. Grigo, K. Kircher and P. R. Müller, "Polycarbonate" in Becker/Braun, Kunststoff-Handbuch, Vol. 3/1, Polycarbonate, Polyacetale, Polyester, Cellulose-ester, Karl Hanser Verlag, Munich, Vienna, 1992, pp. 118-145 as well as to EP-A 0 517 044.

According to this process the phosgenation of a disodium salt of a bisphenol (or a mixture of various bisphenols) in aqueous alkaline solution (or suspension) is carried out in the presence of an inert organic solvent or solvent mixture, which forms a second phase. The oligocarbonates that are formed, and which are present mainly in the organic phase, are condensed with the aid of suitable catalysts to form high molecular weight polycarbonates dissolved in the organic phase. The organic phase is finally separated and the polycarbonate is isolated therefrom by various working up steps.

Suitable dihydroxyaryl compounds for the production of polycarbonates are those of the formula (2)

in which
- Z denotes an aromatic radical with 6 to 30 C atoms, which may contain one or more aromatic nuclei, may be substituted, and may contain aliphatic or cycloaliphatic radicals and/or alkylaryls or heteroatoms as bridging members.

Preferably Z in formula (2) denotes a radical of the formula (3)

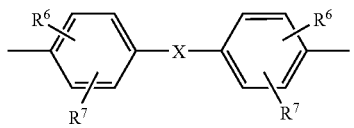

(3)

in which

R$^6$ and R$^7$ independently of one another denote H, C$_1$-C$_{18}$-alkyl, C$_1$-C$_{18}$-alkoxy, halogen such as Cl or Br, or in each case optionally substituted aryl or aralkyl, preferably H or C$_1$-C$_{12}$-alkyl, particularly preferably H or C$_1$-C$_8$-alkyl, and most particularly preferably H or methyl, and X denotes a single bond, —SO$_2$—, —CO—, —O—, —S—, C$_1$- to C$_6$-alkylene, C$_2$- to C$_5$-alkylidene or C$_5$- to C$_6$-cycloalkylidene, which may be substituted with C$_1$- to C$_6$-alkyl, preferably methyl or ethyl, and may also denote C$_6$-C$_{12}$-arylene, which may optionally be condensed with further aromatic rings containing heteroatoms.

Preferably X denotes a single bond, C$_1$- to C$_5$-alkylene, C$_2$- to C$_5$-alkylidene, C$_5$- to C$_6$-cycloalkylidene, —O—, —SO—, —CO—, —S—, —SO$_2$—, or a radical of the formula (3a) or (3b)

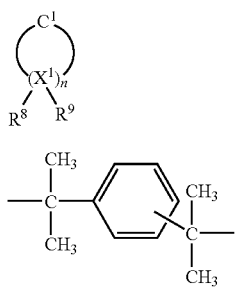

(3a)

(3b)

in which

R$^8$ and R$^9$ denote for each X$^1$, which may be individually selectable, independently of one another hydrogen or C$_1$ to C$_6$-alkyl, preferably hydrogen, methyl or ethyl, and X$^1$ denotes carbon and n is a whole number from 4 to 7, preferably 4 or 5, with the proviso that on at least one atom X$^1$, R$^8$ and R$^9$ are simultaneously alkyl.

Examples of dihydroxyaryl compounds are: dihydroxybenzenes, dihydroxydiphenyls, bi-(hydroxyphenyl)-alkanes, bis-(hydroxyphenyl)-cycloalkanes, bis-(hydroxyphenyl)-aryls, bis-(hydroxyphenyl)-ethers, bis-(hydroxyphenyl)-ketones, bis-(hydroxyphenyl)-sulfides, bis-(hydroxyphenyl)-sulfones, bis-(hydroxyphenyl)-sulfoxides, 1,1'-bis(hydroxyphenyl)-diisopropylbenzenes, as well as their nuclear-alkylated and nuclear-halogenated compounds.

Suitable diphenols for the production of the polycarbonates to be used according to the invention are for example hydroquinone, resorcinol, dihydroxydiphenyl, bis-(hydroxyphenyl)-alkanes, bis(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, α-α'-bis-(hydroxyphenyl)-diisopropylbenzenes, as well as their alkylated, nuclear-alkylated and nuclear-halogenated compounds.

Preferred diphenols are 4,4'-dihydroxydiphenyl, 2,2-bis-(4-hydroxyphenyl)-1-phenylpropane, 1,1-bis-(4-hydroxyphenyl)-phenylethane, 2,2-bis-(4-hydroxyphenyl)propane, 2,4-bis-(4-hydroxyphenyl)-2-methylbutane, 1,3-bis[2-(4-hydroxyphenyl)-2-propyl]benzene (bisphenol M), 2,2-bis-(3-methyl-4-hydroxyphenyl)-propane, bis-(3,5-dimethyl-4-hydroxyphenyl)-methane, 2,2-bis-3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,3-bis-[2-(3,5-dimethyl-4-hydroxyphenyl)-2-propyl]-benzene and 1,1-bis-(4-hydroxyphenyl)-3,3,5-trimethylcyclohexane (bisphenol TMC).

Particularly preferred diphenols are 4,4'-dihydroxydiphenyl, 1,1-bis-(4-hydroxyphenyl)-phenylethane, 2,2-bis-(4-hydroxyphenyl)-propane, 2,2-bis(3,5-dimethyl-4-hydroxyphenyl)-propane, 1,1-bis-(4-hydroxyphenyl)-cyclohexane and 1,1-bis-(4-hydroxyphenyl)-3,3,5-trimethylcyclohexane (bisphenol TMC).

These and further suitable diphenols are described for example in: U.S. Pat. Nos. 2,999,835, 3,148,172, 2,991,273, 3,271,367, 4,982,014 and 2,999,846, in German laid-open specifications 1 570 703, 2 063 050, 2 036 052, 2 211 956 and 3 832 396, in French patent specification 1 561 518, in the monograph by H. Schnell "Chemistry and Physics of Polycarbonates", Interscience Publishers, New York 1964, pp. 28 ff.; pp. 102 ff.; and in D. G. Legrand, J. T. Bendler "Handbook of Polycarbonate Science and Technology", Marcel Dekker, New York, 2000, pp. 72 ff.

In the case of homopolycarbonates only one diphenol is used, while in the case of copolycarbonates two or more diphenols are used. The diphenols that are used, like all other chemicals and auxiliary substances used in the synthesis, may be contaminated with impurities derived from their own synthesis, handling and storage. It is desirable however to work with raw materials that are as pure as possible.

The monofunctional chain terminators that are necessary to regulate the molecular weight, such as phenol or alkylphenols, in particular phenol, p-tert.-butylphenol, iso-octylphenol, cumylphenol, their chlorocarbonic acid esters or acid chlorides of monocarboxylic acids or mixtures of these chain terminators, are either added together with the bisphenolate or bisphenolates to the reaction or alternatively are added at any arbitrary time during the synthesis, so long as phosgene or chlorocarbonic acid terminal groups are still present in the reaction mixture or, in the case of acid chlorides and chlorocarbonic acid esters as chain terminators, so long as sufficient phenolic terminal groups of the polymer being formed are available. Preferably however the chain terminator or terminators is/are added after the phosgenation at a site or at a time at which phosgene is no longer present but the catalyst has not yet been metered in, or the chain terminator(s) is/are metered in before, together with or in parallel with the catalyst.

In the same way branching agents or mixtures of branching agents that are possibly used are added to the synthesis, but usually before the chain terminators. Normally trisphenols, quaternary phenols or acid chlorides of tricarboxylic acids or tetracarboxylic acids are used, or also mixtures of the polyphenols or acid chlorides.

Some of the compounds that may be used containing three or more than three phenolic hydroxyl groups are for example: phloroglucinol, 4,6-dimethyl-2,4,6-tri-(4-hydroxyphenyl)-heptene-2, 4,6-dimethyl-2,4,6-tri-(4-hydroxyphenyl)-heptane, 1,3,5-tri-(4-hydroxyphenyl)-benzene,
1,1,1-tri-(4-hydroxyphenyl)-ethane,
tri-(4-hydroxyphenyl)-phenylmethane,
2,2-bis-[4,4-bis-(4-hydroxyphenyl)-cyclohexyl]-propane,
2,4-bis-(4-hydroxyphenylisopropyl)-phenol,
tetra-(4-hydroxyphenyl)-methane.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

Preferred branching agents are 3,3-bis-(3-methyl-4-hydroxyphenyl)-2-oxo-2,3-dihydroindole and 1,1,1-tri-(4-hydroxyphenyl)-ethane.

The catalysts used in the phase interface synthesis are tertiary amines, in particular triethylamine, tributylamine, trioctylamine, N-ethylpiperidine, N-methylpiperidine, N-i/n-propylpiperidine; quaternary ammonium salts such as tetrabutylammonium/tributylbenzylammonium/tetraethylammonium hydroxide/chloride/bromide/hydrogen sulfate/tetrafluoroborate; as well as the phosphonium compounds corresponding to the ammonium compounds. These compounds are described as typical phase interface catalysts in the literature, are commercially obtainable, and are well known to the person skilled in the art. The catalysts may be added individually, as a mixture, or also together and successively to the synthesis, optionally also before the phosgenation, although addition of catalyst after the addition of phosgene is preferred unless an onium compound or mixtures of onium compounds are used as catalysts, in which case an addition before the addition of phosgene is preferred. The metering in of the catalyst or catalysts may take place in bulk, in an inert solvent, preferably to the polycarbonate synthesis, or also as aqueous solution, and in the case of tertiary amines as their ammonium salts with acids, preferably mineral acids, in particular hydrochloric acid. When using several catalysts or when metering in partial amounts of the total catalyst amount, different metering methods may of course also be employed at different sites or at different times. The total amount of catalysts used is between 0.001 and 10 mole % referred to moles of bisphenols used, preferably 0.01 to 8 mole %, particularly preferably 0.05 to 5 mole %.

Additives conventionally used for polycarbonates may also be added in the usual amounts to the polycarbonates according to the invention. The addition of additives serves to extend the service life or the color (stabilisers), to simplify the processing (e.g. mold release agents, anti-blocking agents, antistatics) or to match the polymer properties to specific stresses (impact modifiers such as rubbers; flame retardants, colorants, glass fibres).

These additives may be added individually or in arbitrary mixtures or as several different mixtures to the polymer melt, and more particularly directly during the isolation of the polymer or after the melting of granules in a so-called compounding step. In this connection the additives or their mixtures may be added as a solid, i.e. as powder or as a melt, to the polymer melt. Another method of metering is to use master batches or mixtures of master batches of the additives or additive mixtures.

Suitable additives are described for example in "Additives for Plastics Handbook", John Murphy, Elsevier, Oxford, 1999, and in "Plastics Additives Handbook", Hans Zweifel, Hanser, Munich, 2001.

Preferred heat stabilisers are for example organic phosphites, phosphonates and phosphanes, generally those compounds in which the organic radicals consist wholly or partially of optionally substituted aromatic radicals. Substituted benztriazoles for example are used as UV stabilisers. These and other stabilisers may be used individually or in combinations and are added in the aforementioned forms to the polymer.

Processing auxiliaries such as mold release agents, generally derivatives of long-chain fatty acids, may also be added. Pentaerythritol tetrastearate and glycerol monostearate for example are preferred. They are generally used alone or as a mixture, preferably in an amount of 0.02 to 1 wt. %, referred to the mass of the composition.

Suitable flame-inhibiting additives are phosphate esters, i.e. triphenyl phosphate, resorcinol diphosphoric acid ester, bromine-containing compounds such as brominated phosphoric acid esters, brominated oligocarbonates and polycarbonates, as well as preferably salts of fluorinated organic sulfonic acids.

Suitable impact modifiers are for example graft polymers containing one or more graft bases selected from at least one polybutadiene rubber, acrylate rubber (preferably ethyl acrylate or butyl acrylate rubber), ethylene/propylene rubbers and graft monomers selected from at least one monomer from the group comprising styrene, acrylonitrile, alkyl methacrylate (preferably methyl methacrylate) or interpenetrating siloxane and acrylate networks with grafted-on methyl methacrylate or styrene/acrylonitrile.

Furthermore colorants such as organic dyes or pigments or inorganic pigments, IR absorbers, may be added individually, as a mixture, or also in combination with stabilisers, glass fibres, (hollow) glass spheres or inorganic fillers.

The present invention furthermore provides the extrudates and molded parts obtainable from the polycarbonates according to the invention, in particular those extrudates and molded parts for use in transparent applications, most particularly in the optical applications sector, such as for example panels, spider-type panels, glazings, diffuser panels, lamp coverings or optical data storage media, such as audio CDs, CD-R(W)s, DVDs, DVD-R(W)s, minidiscs in their various read-only but also write-once and possibly also repeatedly writeable embodiments.

The present invention moreover provides for the use of the polycarbonates according to the invention for the production of extrudates and molded parts.

Further applications are given by way of example, without however restricting the subject matter of the present invention:

1. Safety panels, which are necessary in many areas of buildings, vehicles and aircraft, and as visors for helmets,
2. Films,
3. Blow moldings (see for example U.S. Pat. No. 2,964, 794), for Example 1 to 5 gallon water bottles,
4. Translucent sheets, such as solid sheets or in particular twin-wall sheets, for example for covering buildings such as stations, greenhouses and lighting installations,
5. Optical data storage media, audio-CDs, CD-R(W)s, DCDs, DVD-R(W)s, minidisks, and next generation developments.
6. Traffic light housings or road signs,
7. Foams with an open or closed, optionally printable, surface.
8. Threads and wires (see for example DE-B 1 137 167),
9. Light technology applications, optionally using glass fibres for applications in the translucent sector,
10. Translucent formulations containing barium sulfate, titanium dioxide and/or zirconium oxide or organic polymeric acrylate rubbers (EP-A 0 634 445, EP-A 0 269 324) for producing translucent and light scattering molded parts, 11. Precision injection moldings, such as holders, e.g. lens holders; here polycarbonates having a content of glass fibres and optionally additionally containing 1-10 wt. % $MoS_2$, referred to the total weight, are optionally used.
12. Optical instrument parts, in particular lenses for photographic and film cameras (see for example DE-A 27 01 173),
13. Light carriers, in particular optical cables (see for example EP-A 0 089 801) and lighting strips,
14. Electrical insulating materials for electrical cables and for connector housings and plug-in connectors, as well as capacitors.
15. Mobile telephone casings,
16. Network interface devices,
17. Support materials for organic photoconductors,
18. Lamps, headlights, diffusers or internal lenses,
19. Medical applications such as oxygenators, dialysis machines,
20. Food applications, such as bottles, crockery and chocolate molds,
21. Applications in the automotive sector, such as glazings or in the form of blends with ABS as bumpers.
22. Sports articles, such as slalom poles or ski boot clips,
23. Domestic items such as kitchen sinks, washbasins and letterboxes,
24. Housings, such as electrical distribution cabinets,
25. Casings for electrical devices such as toothbrushes, hairdryers, coffee machines, machine tools such as drills, milling machines, planers and saws.
26. Transparent washing machine portholes.
27. Protective goggles, sunglasses, optical correction spectacles and lenses therefor.
28. Lamp covers.
29. Packaging films.
30. Chip boxes, chip carriers, containers for silicon chips.
31. Miscellaneous applications such as stable doors or animal cages.

EXAMPLES

The procedure for measuring the content of compounds according to formula (I) in the polycarbonate is described hereinafter:

500 mg of polycarbonate were dissolved in 20 g of tetrahydrofuran (THF), 1.91 g of 32% sodium hydroxide and 5 g of water were added, and the mixture saponified overnight (at least 15 hours) at room temperature while shaking. After saponification the solution was acidified with hydrochloric acid and made up to 50 ml with THF.

15 µl were injected into an HPLC instrument. Detection was carried out either with a diode array detector (DAD), fluorescence detector (FLD) or by mass spectrometry (MS).

The calibration was carried out by an external standard method (multipoint calibration).

The method for measuring the field strength on the corresponding injection molded body, which in the present case was an optical disc, was as follows:

In order to measure the electrostatic field a field meter (EMF 581230) from the Eltec company was used. Immediately after the end of the injection molding process the molded part (disc) was removed by a rotor arm and set aside. In this connection the disc must not come into contact with metal since this interferes in the measurement. In addition possible existing ionisers must be screened.

The field meter was positioned above the disc at a distance of 100 mm from the horizontal disc surface. The center of the field meter is positioned in such a way that its projection on the actual measured disc extends 39 mm from the center of the disc. The disc was not moved. The measurement of the field thus took place in a period of 3 to 10 seconds after completion of the injection molding process.

The measurement instrument was connected to an x/y printer, on which the respective values were printed out. A value measured by the field meter was thus associated with each measured disc. In order to limit the amount of data, 100 measurements were carried out after the start of the process, i.e. the corresponding electrical field was recorded from the first 100 discs. After in each case 60 minutes a further 100 measurements were made. After the fourth series of measurements, i.e. after ca. 3 hours, the measurement procedure was stopped.

When carrying out the measurements care should be taken to ensure that the atmospheric humidity during the measurement is 30 to 60%, preferably 35 to 50%, and that the room temperature is 25° to 28° C.

In this method the electrostatic field on the surface of the optical disc was measured by means of a probe directly after the injection molding process. A disc was considered to be difficult to coat if the electrostatic field exceeds a value of 18 kV/m.

Example 1

Preparation of 1-(4-tert.-butylphenyloxycarbonyloxy)-1'(piperidine carboxylic acid)-4,4'-isopropoxylidene diphenyl ester 9.30 g (0.025 mole) of isopropylidene diphenylbischlorocarbonic acid ester were added under argon to 150 ml of dichloromethane and cooled to 0° C. 48.49 g (0.428 mole) of N-ethylpiperidine were dissolved in 20 ml of dichloromethane and added dropwise at 0° C. to the bischlorocarbonic acid ester solution. 3.76 g (0.025 mole) of tert.-butylphenol dissolved in 10 ml of dichloromethane were then added dropwise at 0° C. to this solution. The mixture was heated to room temperature and stirred for 3 hours. The solvent was then removed in vacuo. The residue was boiled in 500 ml of toluene and filtered hot. On cooling, crystals precipitated out in the mother liquor. The mother liquor was filtered and concentrated by evaporation (95° C., 25 mbar). 13.2 g of a highly viscous red oil were obtained. This was dissolved in 100 ml of ethyl acetate and, after addition of 10 g of silica gel (silica gel 60; 0.04-0.063 µm; Merck 109385/ Lt.: 948 785 203), was concentrated by evaporation and added to a silica gel column (column Ø 5 cm, filling height ca. 25 cm). After chromatography with a solvent mixture of n-hexane/ethyl acetate (9:1), 2.3 g of a glassy solid were obtained.

$^1$H-NMR (400 MHz, CDCl3) δ=7.4-7.38 (m, 2H), 7.28-7.23 (m, 2H), 7.22-7.13 (m, 6H), 7.03-6.98 (m, 2H), 3.65-3.45 (m, 4H), 1.70-1.55 (m, 6H), 1.66 (s, 6H), 1.32 (s, 9H).

Example 2

Preparation of 1-(4-tert.-butylphenyloxycarbonyloxy)-1'-(4,4'-isopropylidenediphenyl)-N,N'-diethylcarbamate 5.0 g (0.013 mole) of isopropylidene diphenylbischlorocarbonic acid ester were added at 0° C. under argon to 100 ml of dichloromethane. 4.29 g (0.042 mole) of triethylamine dissolved in 30 ml of dichloromethane were then added dropwise at 0° C. to this solution. 2.02 g (0.013 mole) of tert.-butylphenol dissolved in 30 ml of dichloromethane were next added dropwise. The mixture was heated to room temperature and stirred for 3 hours. The solvent was then removed in vacuo. The residue was boiled in 500 ml of toluene and filtered hot.

The solvent was removed in vacuo. The crude product was chromatographed on silica gel (height: 16 cm, Ø 5 cm, solvent n-hexane/ethyl acetate 9:1).

2.1 g of a yellow highly viscous resin were obtained.

$^1$H-NMR (400 MHz, CDCl$_3$) δ=7.45-7.38 (m, 2H), 7.28-7.15 (m, 8H), 7.05-6.98 (m, 2H), 3.50-3.30 (m, 4H), 1.67 (s, 6H), 1.32 (s, 9H), 1.28-1.15 (m, 6H).

Example 3

Preparation of piperidinecarboxylic acid 4-[1-(4-hydroxyphenyl)-1-methylethyl]-phenyl ester 0.5 g of 1-(4-tert.-butylphenyloxycarbonyloxy)-1'-(piperidinecarboxylic acid)-4,4'-isopropylidene diphenyl ester were dissolved in 20 g of THF, 0.5 g of 32% sodium hydroxide and 5 g of water were added, and the mixture was saponified overnight (at least 15 hours) while shaking.

Working Up:

The aqueous phase of the THF solution was separated and the organic phase was concentrated by evaporation. The residue was taken up in diethyl ether and washed several times with water. The organic phase was dried over magnesium sulfate, filtered off from the drying agent, and the solvent was removed in vacuo. 1.46 g of crude product were obtained, which was chromatographed on silica gel (silica gel 60; 0.04-0.063 μm; Merck 109385/Lt.: 948 785 203) with a solvent mixture of hexane/ethyl acetate (9:1) (column Ø 5 cm, filling height ca. 25 cm). During the further course of the working up hexane/ethyl acetate (5:1) was used as solvent mixture. 1.0 g of a white solid was obtained.

$^1$H-NMR (400 MHz, CDCl$_3$) δ=7.20-7.15 (m, 2H), 7.10-7.05 (m, 2H), 7.02-6.95 (m, 2H), 6.75-6.68 (m, 2H), 3.65-3.45 (m, 4H), 1.63 (s, 6H).

Example 4

Preparation of diethylcarbamic acid 4-[1-(4-hydroxyphenyl)-1-methylethyl]-phenyl ester 0.5 g of 1-(4-tert.-butylphneyloxycarbonyloxy)-1'-(4,4'-isopropylidenediphenyl)-N,N'-diethylcarbamate were dissolved in 20 g of THF, 0.5 g of 32% sodium hydroxide and 5 g of water were added, and the mixture was saponified overnight (at least 15 hours) while shaking.

Purification:

The aqueous phase of the THF solution was separated and the organic phase was concentrated by evaporation. The residue was taken up in diethyl ether and washed several times with water. The organic phase was dried over magnesium sulfate, filtered off from the drying agent, and the solvent was removed in vacuo. The crude product was chromatographed on silica gel (silica gel 60; 0.04-0.063 μm; Merck 109385/Lt.: 948 785 203) with a solvent mixture of hexane/ethyl acetate (9:1) (column Ø 3 cm, filling height ca. 25 cm). During the further course of the working up hexane/ethyl acetate (1:1) was used as solvent mixture. 0.29 g of a white solid was obtained.

$^1$H-NMR (400 MHz, CDCl$_3$) δ=7.26-7.22 (m, H), 7.12-7.08 (m, 2H), 7.04-6.98 (m, 2H), 6.72-6.68 (m, 2H), 3.55-3.35 (m, 4H), 1.67 (s, 6H), 1.35-1.15 (m, 6H).

Example 5

The production of the polycarbonate was carried out according to the known phase interface process. A continuous production process was employed.

The bisphenolate solution (bisphenol A; alkali content 2.12 mole NaOH/mole BPA) was fed in at a rate of 750 kg/hour (14.93 wt. %), the solvent (dichloromethane/chlorobenzene 1:1) was fed in at a rate of 646 kg/hour and the phosgene was fed in at a rate of 56.4 kg/hour, and the mixture was reacted. The temperature in the reactor was 35° C. In addition sodium hydroxide (32 wt. %) was also metered in at a rate of 9.97 kg/hour. In the course of the condensation a second amount of sodium hydroxide (32 wt. %) was fed in at a rate of 29.27 kg/hour, as well as a solution of chain terminators (11.7 wt. % of tert.-butylphenol in methylene chloride/chlorobenzene 1:1) at a rate of 34.18 kg/hour. Next N-ethylpiperidine dissolved in methylene chloride/chlorobenzene (1:1; 2.95 wt. % of N-ethylpiperidine) was fed in as catalyst at a rate of 33.0 kg/hour. The phases were separated and the organic phase was washed once with dilute hydrochloric acid and five times with water. The polycarbonate solution was then concentrated by evaporation, concentrated in an evaporation vessel and the polymer melt was spun through an evaporation extruder and granulated.

0.5 g of the polycarbonate thereby produced (see Table 1) was dissolved in 20 g of THF, 1.9 g of 32% sodium hydroxide and 5 g of water were added, and the mixture was saponfied overnight (at least 15 hours) while shaking. After saponification the solution was acidified with hydrochloric acid and made up to 50 ml with THF. 15 μl of the solution were injected into an HPLC instrument. Detection was carried out with FLD.

The calibration was performed according to an external standard method (multipoint calibration) using the reference substance from Example 3.

The content of carbamate compounds of Example 2 in the polycarbonate according to Example 5 was 37 mg/kg (37 ppm).

Example 6

Comparison Example

The preparation of the polycarbonate was carried out as described in Example 5. However, the bisphenolate solution (bisphenol A) was fed at a rate of 750 kg/hour (14.93 wt. %), the solvent (dichloromethane/chlorobenzene 1:1) was fed at a rate of 646 kg/hour and the phosgene was fed in at a rate of 58.25 kg/hour into the reactor. In addition sodium hydroxide (32 wt. %) was also metered in at a rate of 12.34 kg/hour. The second amount of sodium hydroxide was introduced at a rate of 36.20 kg/hour; the chain terminator was introduced at the rate of 34.18 kg/hour at the concentrations specified in Example 5. The catalyst was introduced at the rate of 33 kg/hour. The working up was carried out as described in Example 5.

0.5 g of the polycarbonate thereby produced (see Table 1) was dissolved in 20 g of THF, 1.9 g of 32% sodium hydroxide and 5.0 g of water were added, and the mixture was saponified overnight (at least 15 hours) while shaking. After saponification the solution was acidified with hydrochloric acid and made up to 5 ml with THF. 15 μl of the solution were injected into an HPLC instrument. The detection was carried out with FLD.

The calibration was carried out according to an external standard method (multipoint calibration) using the reference substance from Example 3.

The content of carbamate compounds of Example 2 in this polycarbonate sample was 285 mg/kg (285 ppm)

TABLE 1

| Example No. | Molecular Weight $M_W$ [g/mole] | Tg [° C.] | Carbamate Derivative of Example 2 after Hydrolysis [mg/kg] | Electrostatic Field on Discs after 3 hours [KV/m] |
|---|---|---|---|---|
| 5 | 17,500 | 145 | 37 | <18 |
| 6 | 17,700 | 145 | 285 | >18 |

As is evident from the table, the polycarbonate according to the invention has carbamate concentrations in the desired range and exhibits the good electrostatic behaviour associated therewith.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A polycarbonate resin produced by the continuous interfacial process characterized in that after alkaline hydrolysis with sodium hydroxide, the polycarbonate resin contains an amount of 0.01 to 150 ppm of carbamate compounds according to formula (1)

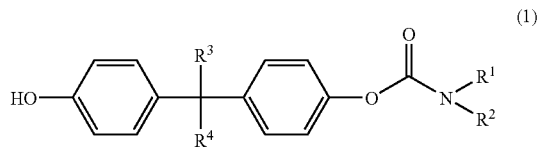
(1)

said amount measured by high pressure liquid chromatography wherein $R^1$ and $R^2$ independently of one another denote hydrogen or $C_1$-$C_{12}$-alkyl, or together denote $C_4$-$C_{12}$-alkylidene, and $R^3$ and $R^4$ independently of one another denote hydrogen, $C_1$-$C_{12}$-alkyl or phenyl, or together with the carbon atom to which they are bonded form cyclohexyl or trimethylcyclohexyl, said process comprising phosgene reacting with at least one bisphenol at 8 to 17% molar excess of phosgene relative to said bisphenol.

2. The polycarbonate according to claim 1 wherein the amount is 0.01 to 100 ppm.

3. The polycarbonate according to claim 1 wherein the amount is 0.01 to 50 ppm.

4. The polycarbonate according to claim 1, wherein $R^1$ and $R^2$ independently of one another denote a member selected from the group consisting of hydrogen, methyl, ethyl, propyl, and butyl, or together denote $C_5$-$C_6$-alkylidene, and $R^3$ and $R^4$ independently of one another denote a member selected from the group consisting of hydrogen, $C_1$-$C_8$-alkyl and phenyl, or together with the carbon atom to which they are bonded form cyclohexyl or trimethylcyclohexyl.

5. A substrate material comprising the polycarbonate according to claim 1.

6. An injection molded article comprising the polycarbonate according to claim 1, characterized in that its electrostatic field measured at a distance of 100 mm therefrom is not more than 18 kV/m.

7. In a process of producing an article by injection-molding, the improvement comprising including the polycarbonate according to claim 1.

8. The injection-molded article prepared by the process of claim 7.

9. An optical data storage medium comprising a substrate material according to claim 5.

* * * * *